US010994231B2

(12) United States Patent
Uliel

(10) Patent No.: US 10,994,231 B2
(45) Date of Patent: May 4, 2021

(54) WATER FILTER

(71) Applicant: FILTER ART LTD., Metula (IL)

(72) Inventor: Eran Uliel, Metula (IL)

(73) Assignee: FILTER ART LTD., Metula (IL)

( * ) Notice: Subject to any disclaimer, the term of this patent is extended or adjusted under 35 U.S.C. 154(b) by 0 days.

(21) Appl. No.: 16/473,644

(22) PCT Filed: Feb. 14, 2018

(86) PCT No.: PCT/IL2018/050171
§ 371 (c)(1),
(2) Date: Jun. 26, 2019

(87) PCT Pub. No.: WO2018/178965
PCT Pub. Date: Oct. 4, 2018

(65) Prior Publication Data
US 2020/0009484 A1 Jan. 9, 2020

(30) Foreign Application Priority Data

Mar. 30, 2017 (IL) .......................................... 251485

(51) Int. Cl.
| | | |
|---|---|---|
| *B01D 33/23* | (2006.01) | |
| *B01D 33/50* | (2006.01) | |
| *B01D 29/41* | (2006.01) | |
| *B01D 29/62* | (2006.01) | |
| *B01D 29/54* | (2006.01) | |
| *B01D 33/44* | (2006.01) | |
| *B01D 33/39* | (2006.01) | |

(Continued)

(52) U.S. Cl.
CPC ........... *B01D 33/23* (2013.01); *B01D 29/413* (2013.01); *B01D 29/54* (2013.01); *B01D 29/58* (2013.01); *B01D 29/62* (2013.01); *B01D 33/39* (2013.01); *B01D 33/44* (2013.01); *B01D 33/463* (2013.01); *B01D 33/50* (2013.01)

(58) Field of Classification Search
CPC ...... B01D 29/413; B01D 29/54; B01D 29/58; B01D 29/62; B01D 29/68; B01D 33/23; B01D 33/39; B01D 33/44; B01D 33/463; B01D 33/50; B01D 33/21; B01D 33/215; B01D 33/25; B01D 33/503; B01D 29/41
See application file for complete search history.

(56) References Cited

U.S. PATENT DOCUMENTS

| | | | | |
|---|---|---|---|---|
| 10,220,336 | B2 * | 3/2019 | Kotler .................... | B01D 33/39 |
| 2011/0297604 | A1 * | 12/2011 | Bryan ..................... | B01D 29/41 |
| | | | | 210/232 |
| 2013/0206674 | A1 * | 8/2013 | Fraser ................... | B01D 29/668 |
| | | | | 210/333.01 |

* cited by examiner

*Primary Examiner* — Terry K Cecil
(74) *Attorney, Agent, or Firm* — Mark M. Friedman

(57) ABSTRACT

A filter includes a filter assembly deployed within a pressure vessel. The filter includes a series of filter configurations arranged along a central flow path connected to an outlet. Each filter configuration has filter screens overlying at least one filtrate channel which directs filtered fluid to the central flow path, A partition is deployed within the pressure vessel so as to subdivide the pressure vessel into a first filter chamber and a second filter chamber, each containing a number of the filter assemblies. A flow diverter is deployed in the central flow path for diverting a flow of filtered liquid passing along the central flow path from the first filter chamber so as to flow outwards from the central flow path to undergo a second filtering in the second filter chamber. Also disclosed is an outlet flow throttling arrangement to avoid overload of a backwash cleaning system.

10 Claims, 9 Drawing Sheets

(51) Int. Cl.
*B01D 29/58* (2006.01)
*B01D 33/46* (2006.01)

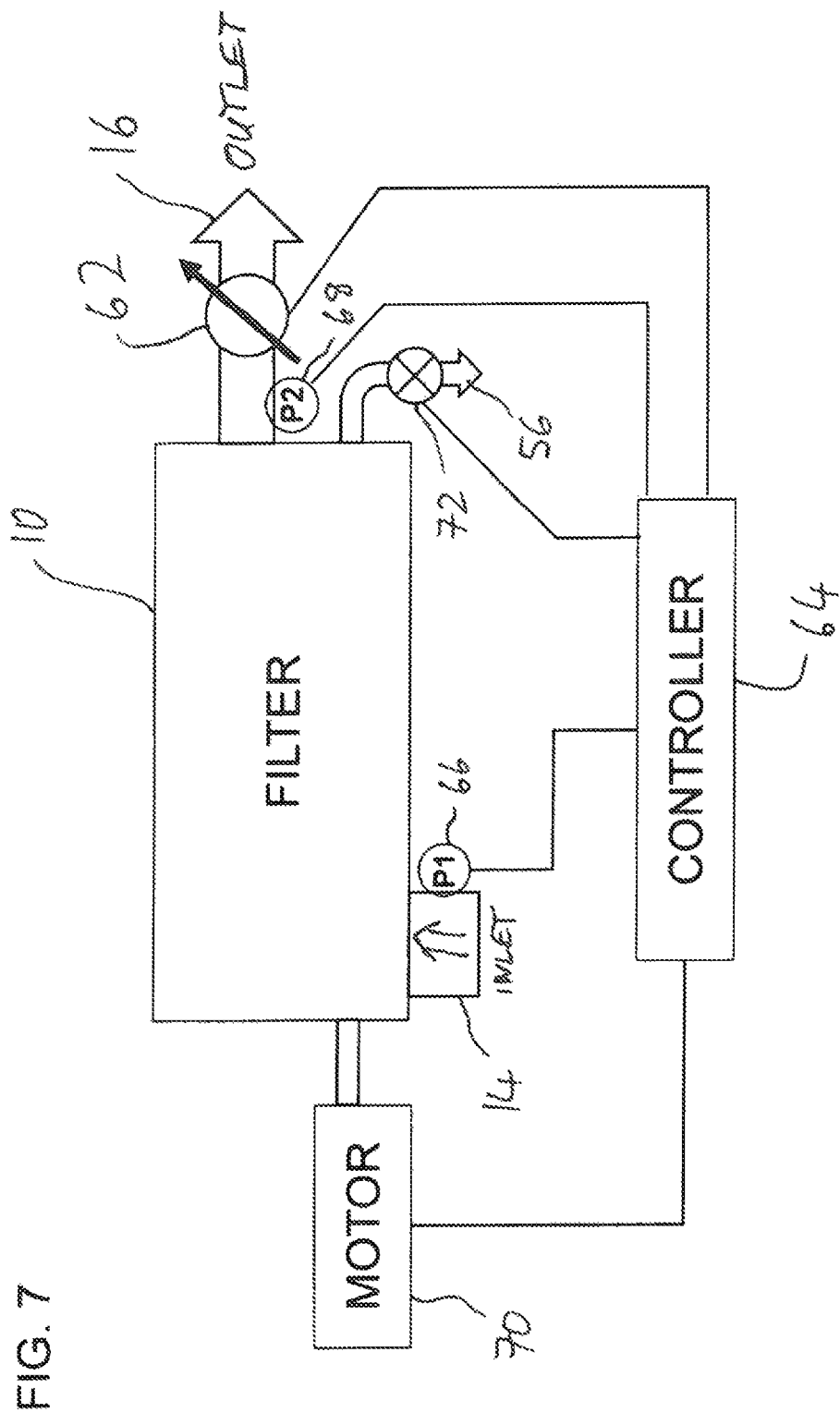

WATER FILTER

FIELD AND BACKGROUND OF THE INVENTION

The present invention relates to filters and, in particular, it concerns a filter providing two-stage filtering within a single pressure vessel and/or with flow throttling to avoid overload of a backwash cleaning system.

It is known to provide filtering using an array of disk-like filters coaxially arrayed along a central flow path within a pressure vessel. A backflush arrangement cleans accumulated solids from the surface of the filter disks. Examples of such filters may be found in U.S. Pat. No. 5,855,799 and PCT Patent Publication No. WO2016/030903.

In certain applications, filtering efficiency is improved by performing two-stage filtering, first removing coarse particles from the liquid (typically water, sea-water or fluids in industrial processes), and then performing a fine filtering process. In high flow-volume systems operating under pressure, a large proportion of the cost of a filtering system is invested in the pressure vessel, and on instrumentation and accessories around the filter, such as valves, non-return valves, manifold brackets etc., making two-stage filtration systems bulky and expensive.

Proper operation of the backflush cleaning arrangement is dependent on having a significant pressure differential between the downstream side of the filter screen and a backflush drain in order to cause reverse flow through the filter screen. Under peak conditions of suspended solids, solids may accumulate on the filter screen faster than the backwash system can remove them so that the filter becomes clogged, reducing the pressure on the downstream side of the filter screen to near drain pressure, in which case the backwash process fails and filter operation may be interrupted until the filter is serviced.

SUMMARY OF THE INVENTION

The present invention is a filter providing two-stage filtering within a single pressure vessel and/or with flow throttling to avoid overload of a backwash cleaning system.

According to the teachings of an embodiment of the present invention there is provided, a filter for filtering a flow of liquid, the filter comprising: (a) a pressure vessel having an inlet and an outlet; (b) a partition deployed within the pressure vessel so as to subdivide the pressure vessel into a first filter chamber and a second filter chamber; (c) a first filter configuration deployed within the first filter chamber, the first filter configuration comprising a filter screen having a first opening size; (d) a second filter configuration deployed within the second filter chamber, the second filter configuration comprising a filter screen having a second opening size smaller than the first opening size, wherein liquid flowing from the inlet to the outlet passes sequentially through the first filter configuration and through the second filter configuration; and (e) an automated cleaning arrangement deployed to remove accumulated solids from the filter screens of both the first filter configuration and the second filter configuration during operation of the filter.

According to a further feature of an embodiment of the present invention, each of the first and second filter configurations is a filter disk comprising a spacer having first and second outward-facing filter screen support configurations, and having an outlet for flow of filtered liquid inwards to a central flow path, the first and second filter screen support configurations of the spacer supporting first and second filter screens forming corresponding first and second surfaces of the filter disk.

According to a further feature of an embodiment of the present invention, there is also provided a flow diverter deployed in the central flow path for diverting a flow of filtered liquid passing along the central flow path from the first filter configuration so as to flow outwards from the central flow path to undergo a second filtering in the second filter chamber.

According to a further feature of an embodiment of the present invention, the pressure vessel has a cylindrical wall, and wherein the partition is formed with an elastomer seal for sealing against an internal surface of the cylindrical wall.

According to a further feature of an embodiment of the present invention, the plurality of filter configurations includes at least a third filter configuration, and wherein the filter configurations and the partition are configured for assembling alternately in a first configuration in which the third filter configuration is deployed on a first side of the partition so as to be within the first filter chamber and a second configuration in which the third filter configuration is deployed on a second side of the partition so as to be within the second filter chamber, thereby varying a number of the filter configurations in each of the first and second filter chambers.

According to a further feature of an embodiment of the present invention, the automated cleaning arrangement comprises a backwash assembly comprising a plurality of backwash nozzles including at least one backwash nozzle deployed for cleaning the filter screen of each of the first and second filter configurations, wherein the plurality of backwash nozzles are mounted so as to move together with a backwash assembly axle, the backwash assembly axle passing through the partition so as to extend within both the first and the second filter chambers.

There is also provided according to the teachings of an embodiment of the present invention, a filter for filtering a flow of liquid, the filter comprising: (a) a pressure vessel having an inlet and an outlet; (b) a filter assembly deployed within the pressure vessel, the filter assembly comprising a filter screen deployed to filter liquid passing from the inlet to the outlet; (c) an automated cleaning arrangement deployed to remove accumulated solids from the filter screen during operation of the filter; (d) an adjustable valve associated with the outlet and adjustable to vary a flow impedance for liquid flowing via the outlet; and (e) a controller deployed to control the adjustable valve, the controller having sensing connections to the pressure vessel and being configured to be responsive to a pressure difference between liquid pressure at the inlet and at the outlet such that, when the pressure difference exceeds a predetermined value, the controller controls the adjustable valve to constrict a rate of liquid flow via the outlet until operation of the automated cleaning arrangement stabilizes the pressure difference.

According to a further feature of an embodiment of the present invention, the automated cleaning arrangement comprising a backwash assembly comprising: (a) a backwash conduit terminating in a suction nozzle deployed in facing relation to the filter screen, the backwash conduit being in fluid interconnection with a backwash drain; and (b) a drive mechanism for displacing at least one of the suction nozzle and the filter screen so as to generate a relative scanning motion of the suction nozzle across an area of the filter screen.

According to a further feature of an embodiment of the present invention, the filter screen is flat, and wherein the suction nozzle traces a spiral path across a surface of the filter screen.

According to a further feature of an embodiment of the present invention, the filter screen is cylindrical, and wherein the suction nozzle traces a helical path across a surface of the filter screen.

According to a further feature of an embodiment of the present invention, the filter assembly comprises a plurality of filter disks coaxially arrayed along a central flow path in fluid communication with the outlet, the drive mechanism comprising a rotary driver for driving rotation of the filter assembly about an axis of the filter assembly.

According to a further feature of an embodiment of the present invention, the backwash conduit extends along a backwash arm, the drive mechanism moving the backwash arm in a reciprocating arcuate motion so that the suction nozzle moves in a spiral path across a surface of the filter screen.

According to a further feature of an embodiment of the present invention, the controller is an electronic controller comprising a processing system and an actuator operated by the processing system to adjust the adjustable valve, the sensing connections being implemented as electrical connections to pressure sensors deployed for sensing a pressure in the inlet and a pressure in the outlet.

According to a further feature of an embodiment of the present invention, the controller is a hydraulic controller comprising at least one hydraulic actuator deployed to adjust the adjustable valve, the sensing connections being implemented as hydraulic connections to the inlet and the outlet.

BRIEF DESCRIPTION OF THE DRAWINGS

The invention is herein described, by way of example only, with reference to the accompanying drawings, wherein:

FIG. 7 is a schematic block diagram of a filter system for operating the filter of FIG. 1;

DESCRIPTION OF THE PREFERRED EMBODIMENTS

Figure 1:
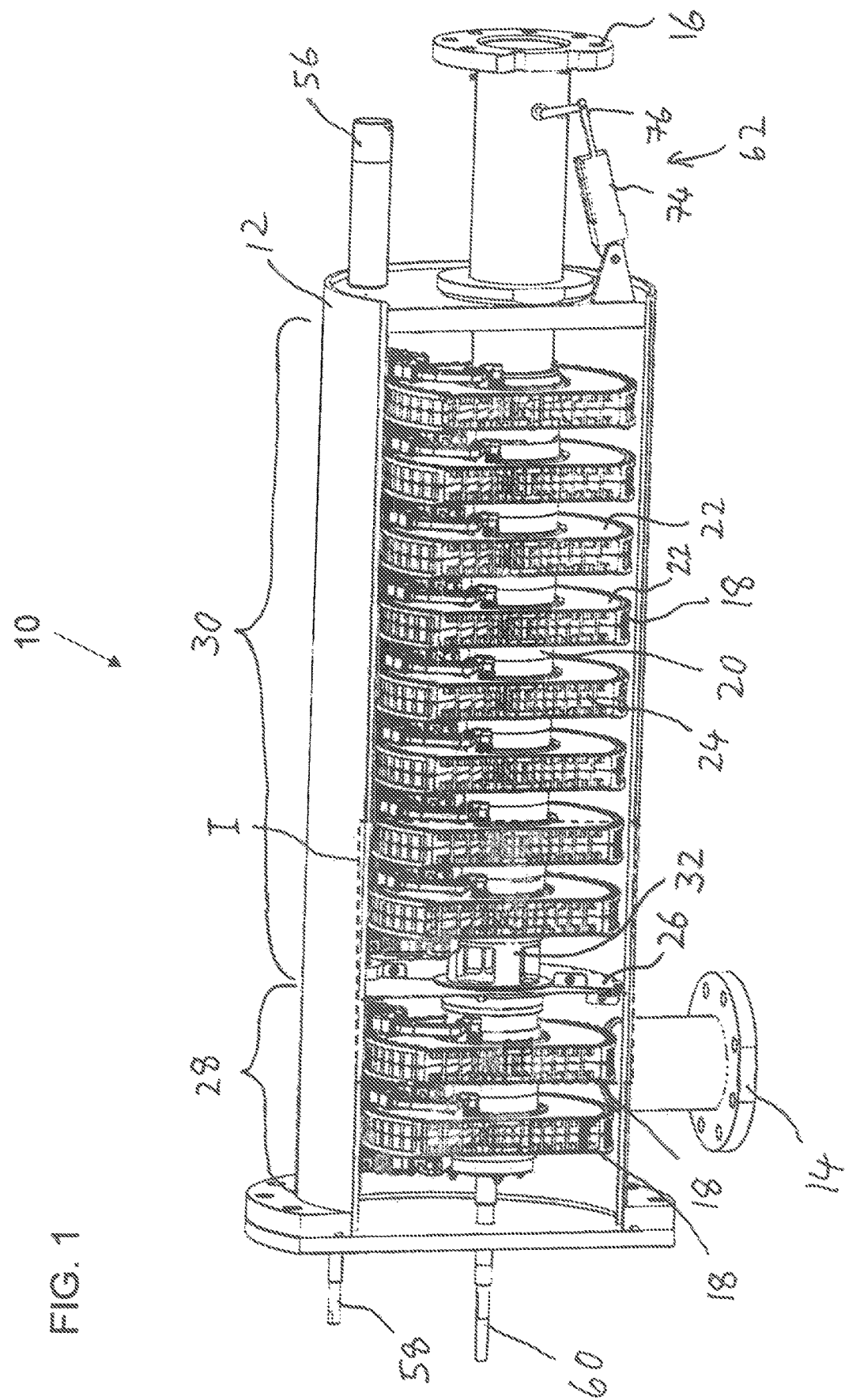
FIG. 1 is a cut-away isometric view of a filter, constructed and operative according to an embodiment of the present invention, providing two-stage filtering within a single pressure vessel.
Figure 2:
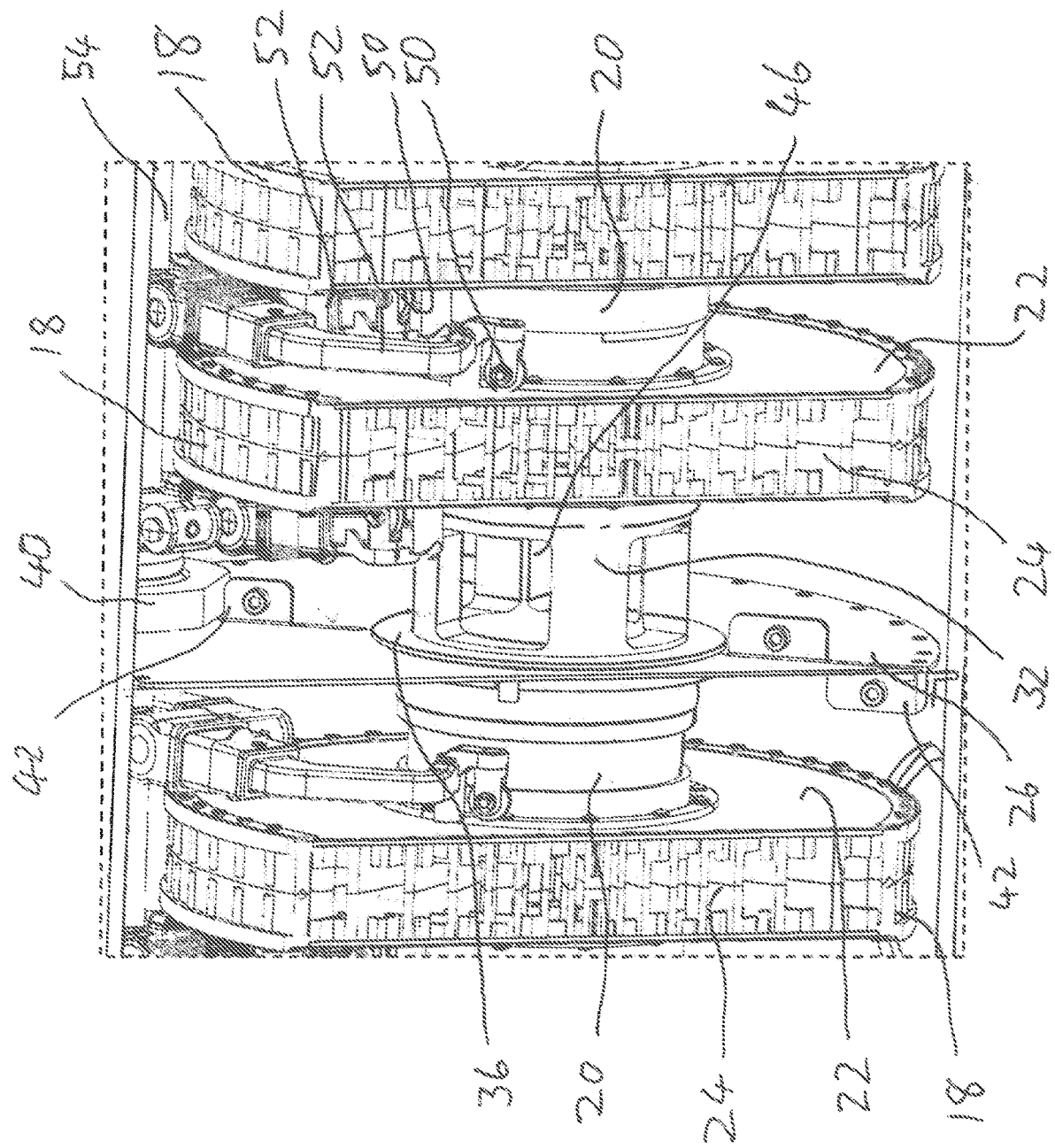
FIG. 2 is an enlarged view of a region of FIG. 1 designated "I"
Figure 3:
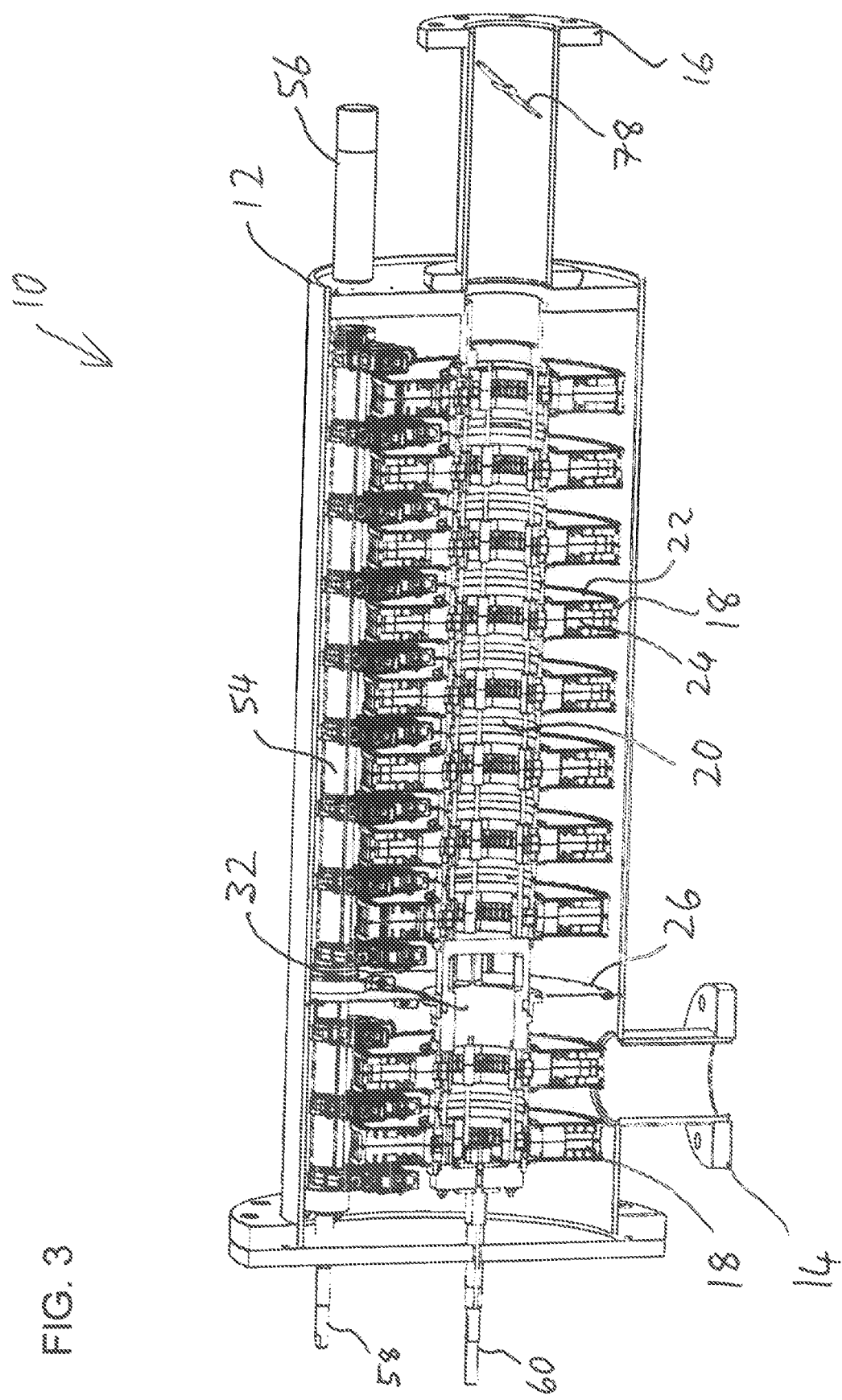
FIG. 3 is a further cut-away isometric view of the filter of FIG. 1, here cut away along a plane passing through a central axis of a filter assembly.
Figure 4:
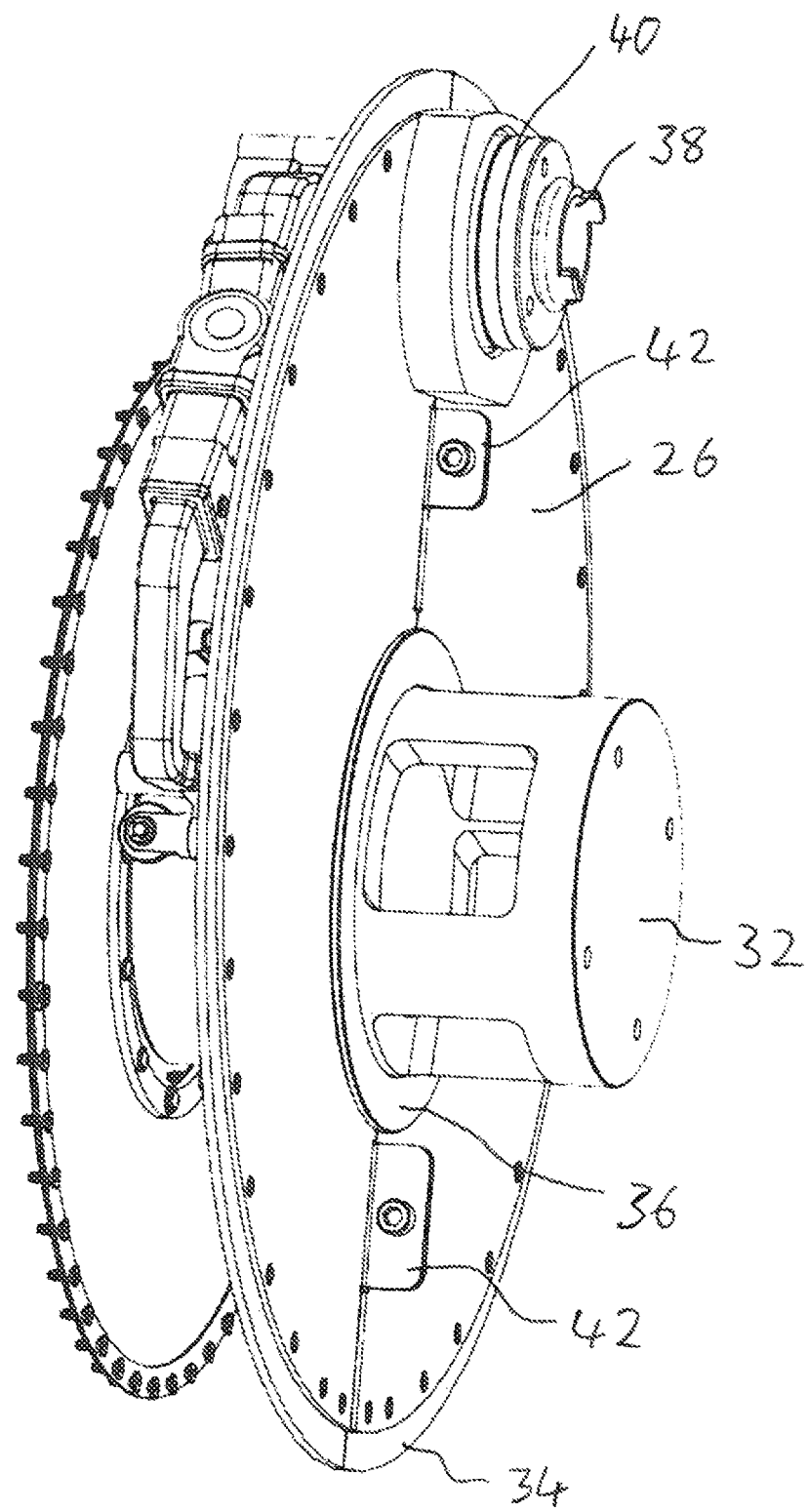
FIG. 4 is an enlarged isometric view of a partition assembly from the filter of FIG. 1.
Figure 5:
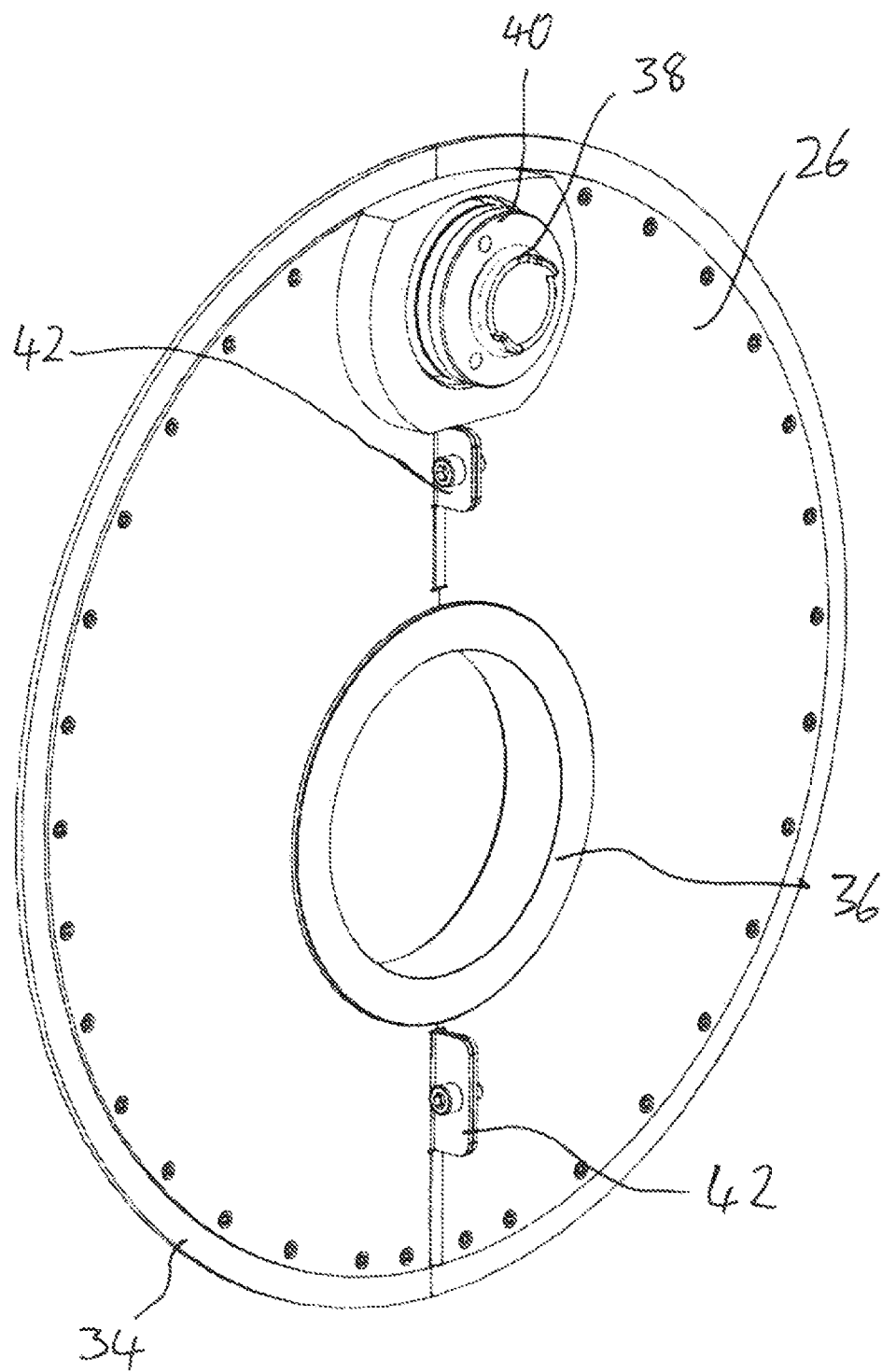
FIG. 5 is an enlarged isometric view of the partition from the partition assembly of FIG. 4.
Figure 6A:
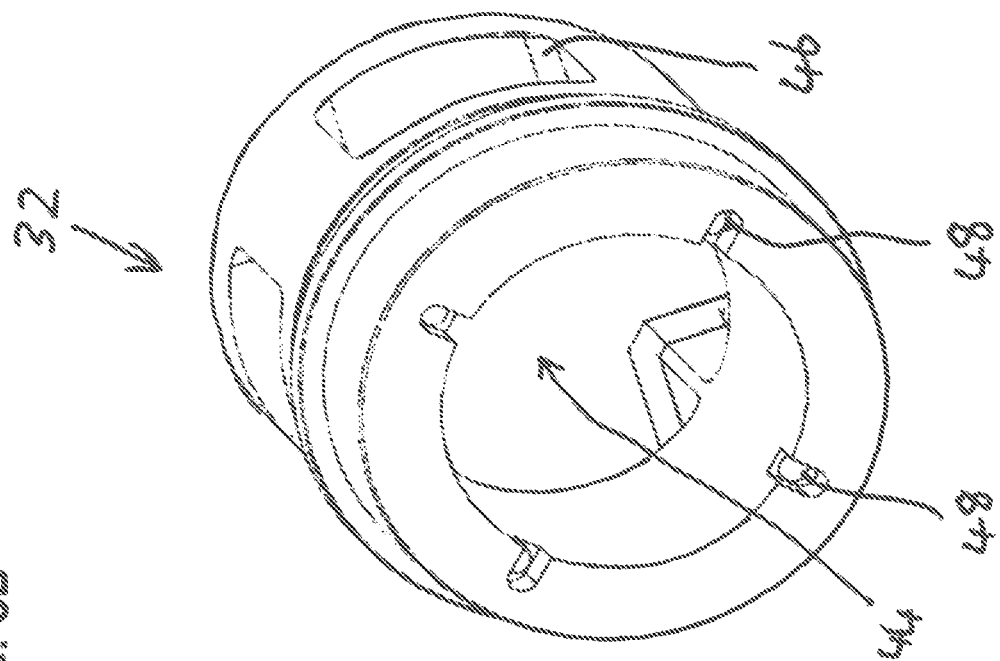
FIGS. 6A and 6B are isometric views in differing orientations of a flow diverter from the partition assembly of FIG. 4.
Figure 6B:
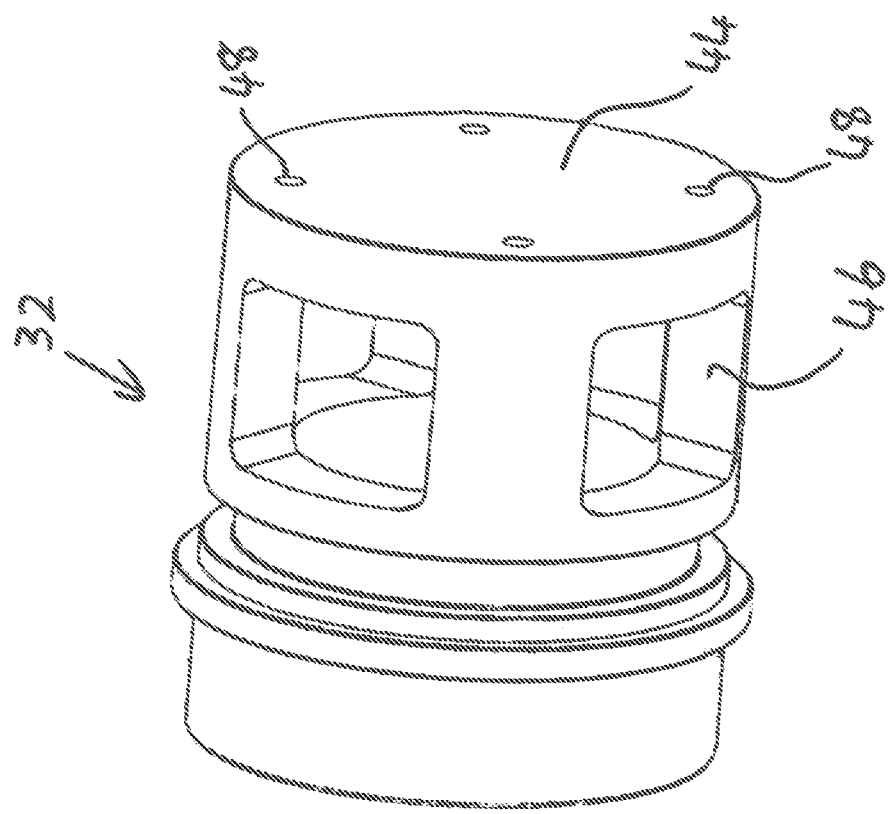

The present invention is a filter providing two-stage filtering within a single pressure vessel and/or with flow throttling to avoid overload of a backwash cleaning system.

The principles and operation of filters according to the present invention may be better understood with reference to the drawings and the accompanying description.

Referring now to the drawings, FIGS. 1-6B illustrate various features of a filter, generally designated 10, constructed and operative according to an embodiment of the present invention, for filtering a flow of liquid. In general terms, filter 10 is implemented as a pressure vessel 12 having an inlet 14 and an outlet 16. Within pressure vessel 12 is deployed a filter assembly having a plurality of filter configurations 18 coaxially arrayed along a central flow path 20 in fluid communication with outlet 16. Each filter configuration has at least one filter screen 22 overlying one or more filtrate channels 24 which are in fluid connection with central flow path 20 such that liquid within pressure vessel 12 around the filter configurations 18 passes through filter screen 22 and along filtrate channels 24 to central flow path 20. Most preferably, filter configurations 18 are double-sided disks having a filter screen 22 on each face of a spacer which defines internal filtrate channels 24.

It is a particular feature of a first aspect of the present invention that the filter assembly further includes a partition assembly including a partition 26 deployed so as to subdivide pressure vessel 12 into a first filter chamber 28 and a second filter chamber 30, each of which includes at least one of filter assemblies 18. The partition assembly also includes a flow diverter 32 deployed within, and interrupting, central flow path 20, so as to divert a flow of filtered liquid passing along central flow path 20 from first filter chamber 28 so as to flow outwards to undergo a second filtering in second filter chamber 30.

The effect of the partition assembly is to subdivide the volume of pressure vessel 12 into a two-stage filter configuration. Liquid delivered via inlet 14 first enters first filter chamber 28 where it passes through the filter screens of filter assemblies 18 within the first filter chamber and starts to flow along the central flow path 20 towards the second filter chamber. On reaching flow diverter 32, the liquid is released outwards into the main volume of second filter chamber 30 where it undergoes a second stage filtration at the filter screens of the remaining filter assemblies 18 and flows inwards to the second part of central flow path 20 where it flows to outlet 16. The filter preferably employs relatively coarse filter screens 22 with a first opening size in first filter chamber 28 and finer filter screens 22 with a second opening size, smaller than the first opening size, in second filter chamber 30, thereby achieving two-stage filtration within the overall form factor of a single pressure vessel 12.

Structurally, partition 26 is typically a flat plate of material shaped to fit the internal dimensions and shape of pressure vessel 12, and typically a round plate for fitting within a cylindrical pressure vessel. Sealing around the outer periphery of partition 26 may advantageously be provided by an elastomer seal 34 which bears an internal surface of the cylindrical wall. In the particularly preferred implementation illustrated here, the rigid plate of partition 26 is formed somewhat undersize for the internal dimensions of the pressure vessel, and elastomer seal 34 is formed as a blade-type seal projecting outwards from the rigid plate. It will be noted that, under normal operating conditions, there is minimal pressure differential across the partition between first and second filter chambers, such that an elastomeric seal of the sort described is typically sufficient to prevent flow from bypassing the first stage of filtration. Furthermore, any leakage around the partition would not lead to contamination of the filter output, since it will anyway be subject to the finer second stage of filtering, so the seal does not need to be hermetic. In fact, the use of a blade-type seal, with limited ability to withstand pressure differential between the chambers, is useful as a pressure release feature. In the event that the first-stage filter assemblies become clogged faster than the backflush cleaning system (described below) can clear it, any localized pressure build up in the first filter chamber is released by deflecting the elastomeric seal, acting as a pressure release valve, thereby avoiding risk of damage to the components of the filter. Filtering quality is maintained by the finer second stage filtering which continues as normal.

Partition 26 has a near-central aperture within which accommodates flow deflector 32 incorporated into central flow path 20. A collar 36 located within the aperture helps to maintain alignment of partition 26 perpendicular to the central flow path, and allows rotation of flow deflector 32 within the collar 36. A second aperture is provided with a tube segment 38 mounted in a bearing arrangement 40 which interconnects with adjacent tube segments to form a backflush axle and drain tube.

Optionally, for ease of assembly, the rigid part of partition 26 may be formed from two or more parts, typically subdivided along a line which passes through the aforementioned apertures. The parts are rigidly interconnected, for example, by bolting together complementary flanges 42 on each side of the partition, as shown.

Flow diverter 32 is typically a section of tube which has a closed end 44 and lateral openings 46. Flow diverter 32 preferably also feature through-bores 48 for accommodating assembly bolts which pass through, and clamp together, the entire filter assembly.

As mentioned earlier, filter configurations 18 are preferably double-sided disks having a filter screen 22 on each face of a spacer which defines internal filtrate channels 24. Details of various implementations of such filter disks may be found in the aforementioned PCT Patent Publication No. WO2016/030903, although the invention is not limited to those specific implementations. Most preferably, filter configurations are assembled modularly, such as on the aforementioned set of assembly bolts, in any desired number, and can be arranged in different sequences with the partition assembly. In the configuration illustrated, the device is shown with two filter configurations in the first filter chamber prior to the partition assembly, followed by a sequence of 8 filter configurations in the second filter chamber. In cases where a larger filter area is desired for the first stage filtering, the components can be assembled in a different sequence, placing the partition assembly after three, or four, filter configurations (with suitable substitution of the filter screens for screens of the required grade). Similarly, the number of filter configurations in the first filter chamber may be reduced, or the partition assembly may be omitted altogether to assemble a larger-area single-stage filter configuration, all according to the requirements of the specific application. This modularity provides flexibility to address the needs of each particular application, tailoring the filter solution to the properties of the available water supply and the filter output requirements.

Filter 10 preferably includes an automated cleaning arrangement deployed to remove accumulated solids from filter screens 22 of the filter configurations 18 in both first filter chamber 28 and second filter chamber 30 during operation of the filter. According to a subset of particularly preferred but non-limiting embodiments of the present invention, the automated cleaning arrangement is implemented as a backwash assembly for cleaning filter screens 22. The backwash assembly preferably includes a plurality of backwash nozzles 50. The backwash assembly preferably provides for a scanning motion of backwash nozzles 50 over the surface of filter screens 22. This can be achieved with various different forms of relative motion, as is known in the art. In the particularly preferred but non-limiting example illustrated herein, backwash nozzles 50 are mounted on backwash arms 52 which connect to a hollow backwash axle 54. Axle 54 serves additionally as a conduit connecting the backwash assembly to a drain connection 56. A drive connection 58 projects from pressure vessel 12 and is linked to axle 54 so as to allow driving motion of the axle in angular reciprocation. This is preferably combined with a rotary motion of the filter assembly driven via a drive connection 60 aligned with central flow path 20. By driving drive connection 60 in continuous rotation and drive connection 58 in a reciprocating angular motion, backwash nozzles 50 are made to follow a spiral scanning path across the surface of filter screens 22, thereby progressively sweeping across the entire active surface of the filter screens. Most preferably, the gaps between adjacent filter disk assemblies accommodate two backwash nozzles, one for cleaning the left surface of the right-side assembly and the other for cleaning the right surface of the left-side assembly. The backwash assembly thus far described is essentially similar to that of the aforementioned PCT Patent Publication No. WO2016/030903, and further details of at least one non-limiting preferred implementation may be found therein.

According to this aspect of the present invention, the aforementioned backwash assembly is preferably adapted to accommodate the subdivision of the pressure vessel into first and second filter chambers, while maintaining a common backwash axle 54 and drive system for the backwash arrangement in both filter chambers. To this end, tube segment 38 interlocks with the remaining modular segments of hollow axle 54 to provide a unified shaft passing through, and rotatable relative to, partition 26. Similarly, flow diverter 32, united via rods passing through through-bores 48 with the other modular segments of central flow path 20 passing through the filter assemblies 18, forms a unitary central column of the filter assembly which passes through, and is rotatable relative to, partition 26. Thus, by rotating drive connection 60 in continuous rotation and drive connection 58 in angular reciprocating motion, the required spiral scanning motion of the backwash nozzles is achieved simultaneously and synchronously for the filter screens 22 in both the first filter chamber 28 and the second filter chamber 30. The backwash nozzle assemblies on either side of partition 26 provide only one nozzle arm and one nozzle facing towards the adjacent filter screen, similar to at the outside ends of the assembly.

Turning now to a second aspect of the present invention, this relates to a system and corresponding method for operating a filter with an automated cleaning arrangement, such as a backwash cleaning arrangement, in which an adjustable valve 62 associated with outlet 16 is adjustable to vary a flow impedance for liquid flowing via the outlet. A controller 64 is deployed to control adjustable valve 62 responsively to a pressure difference between liquid pressure at the inlet and at the outlet such that, when the pressure difference exceeds a predetermined value, the controller controls the adjustable valve to constrict a rate of liquid flow via the outlet until operation of the automated cleaning arrangement stabilizes the pressure difference.

Filter systems are preferably implemented such that, under normal operating conditions, there is a small pressure differential across the filter screen. Depending upon the application, the backwash cleaning system may run continuously, or intermittently, on a timer and/or when triggered by a slightly increased pressure difference indicative of accumulation of solids on the filter screens. In various circumstances, however, there are large variations in the quantities of suspended solids in the supplied fluid, which may vary by orders of magnitude, peaking at certain times. One such example is a water supply drawn from sources which at times include run-off rain water which may suddenly introduce unusual quantities of soil and other particles into a water source. At such times of peak suspended solids, the rate of accumulation of solids on the filter screens may be such that the time taken between passes of each backwash nozzle over a certain region of filter screen exceeds the time taken for the filter screen to become clogged. This results in a progressive build-up of solids on the filter screens, progressively choking the filtering process. If this accumulation continues unabated, the pressure downstream of the filter screen drops drastically, which in turn reduces the efficiency of the backwash process which requires a significant pressure differential between the downstream side of the screen and the drain in order to clean the screen. These effects would normally compound each other, leading rapidly to complete blockage of the filter. Once blocked, the backwash is ineffective, and the filter cannot be returned to operation without major servicing.

This aspect of the present invention addresses this problem by responding to increased pressure difference across the filter so as to throttle liquid flow through the filter. The reduced rate of flow inherently reduces the rate of build-up of solids on the filter screen until a balance is reached at which the backwash system is keep up with the rate of accumulation of solids and maintain proper operation of the filter.

FIG. 7 illustrates schematically a first system for implementing the above aspect of the present invention. Filter 10 is provided with sensing connections to the pressure vessel which allow sensing of a pressure differential between inlet 14 and outlet 16. In the case illustrated here, these sensing connections are implemented as pressure sensors 66 and 68 which are deployed to generate respective signals indicative of the inlet and outlet pressures P1 and P2, respectively, which are supplied to controller 64. In this case, the controller is preferably implemented as an electronic controller, which may be implemented using analogue or digital electronics, and may be a dedicated device or a suitably-programmed device based on one or more general-purpose microprocessors. Controller 64 preferably includes outputs for selectively actuation a motor drive system 70 which is linked to drive the required motions of drive connections 58 and 60 (mechanical details omitted for simplicity) and an electrically-actuated open-closed valve 72 on drain 56. This allows controller 64 to control starting and stopping of the backwash cleaning cycle. Additionally, controller 64 has an output associated with an actuator of adjustable valve 62.

Figure 9:
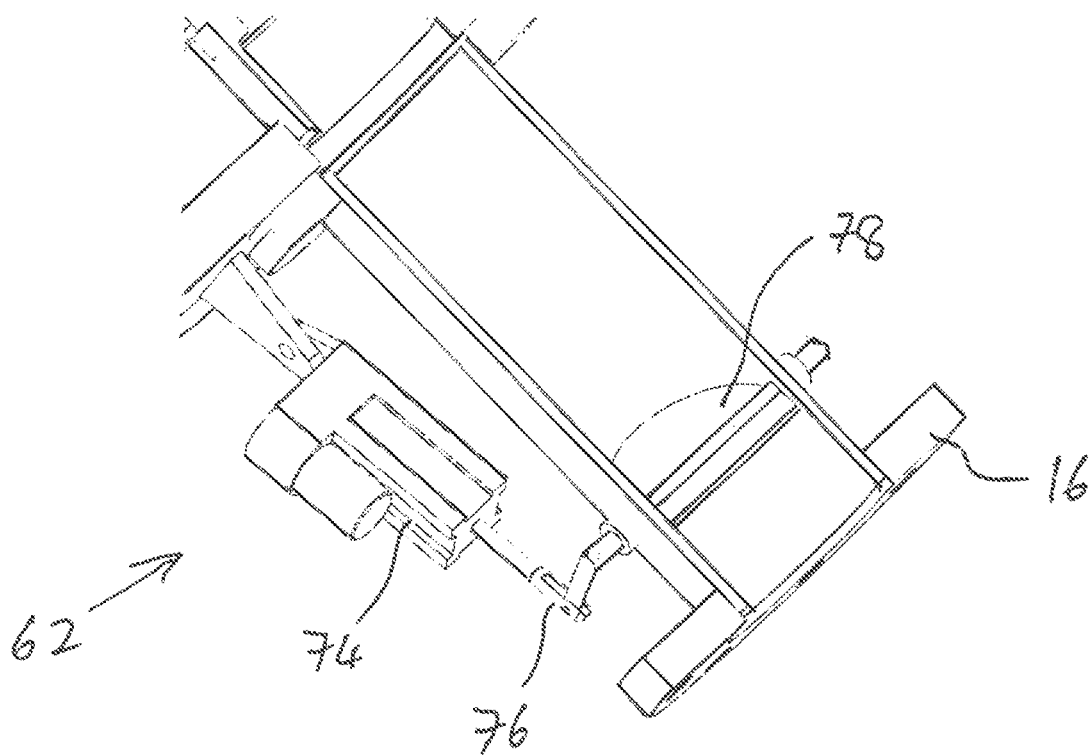
FIG. 9 is an enlarged isometric cut-away view of an outlet of the filter of FIG. 1 showing deployment of a flow-throttling arrangement for throttling the outlet flow.

One possible implementation of adjustable valve 62 as shown in detail in FIG. 9 includes an electrically-controlled actuator 74 deployed to displace a linkage 76 which rotates a shutter element 78, here implemented as a centrally-pivoting disc. Pivoting of the shutter element between a state parallel to the flow and a state angled to the flow direction causes adjustment of the flow impedance through outlet 16, and thus of flow rates through the filter. It should be noted that adjustable valve 62 essentially performs a throttling (flow reduction) function, and is not necessarily designed to achieve complete occlusion of the flow path in its maximum-throttling state.

Figure 8:
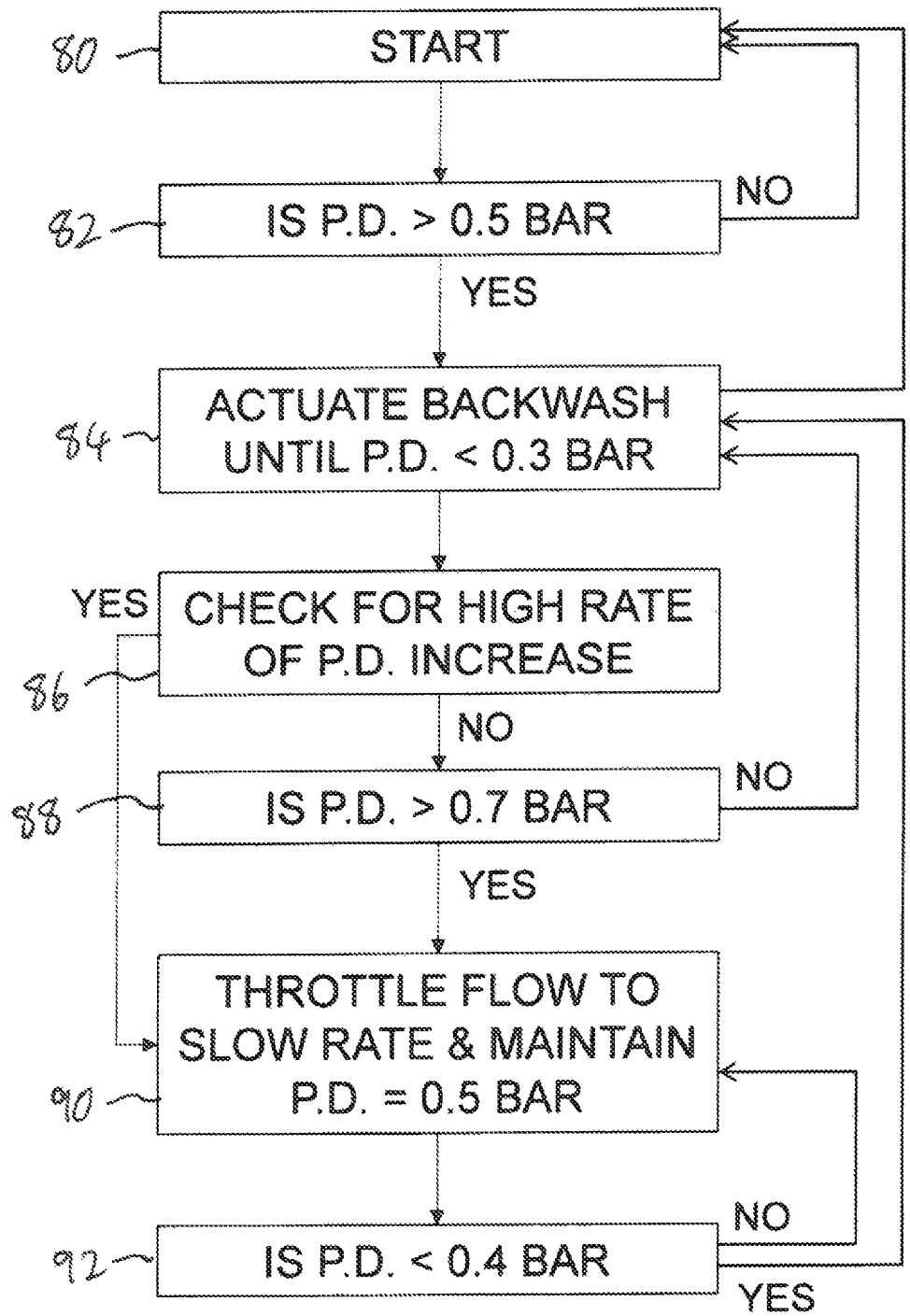
FIG. 8 is a flow diagram illustrating a possible sequence of operation of the filter system of FIG. 7.

FIG. 8 illustrates a non-limiting exemplary flow process for operation of the system of FIG. 7. Specifically, starting at 80, the process monitors at 82 whether the pressure differential ("PD") between P1 and P2 exceeds a first threshold value, for example, 0.5 bar. If not, no action is taken and operation of the filter continues without intervention of the control system. If the first threshold value is exceeded, at 84 the backwash system is actuated (i.e., by actuating motor drive system 70 and opening drain valve 72. While the backwash system is operating, the PD is monitored for various different conditions. If PD falls back below a base value, typically somewhat lower than the first threshold value (e.g., 0.3 bar), the backwash is stopped and the filter returns to passive operation. If a high rate of increase in PD is detected (i.e., "yes" at 86), or if the PD exceeds a second higher threshold, exemplified here by 0.7 bar, ("yes" at 88), the flow passes to step 90 at which controller 64 controls adjustable valve 62 so as to reduce the flow rate through the filter until PD is controlled, keeping the PD within some target range. In the non-limiting example illustrated here, closed-loop adjustment of the flow rate is performed to stabilize the PD at or near a target value of, for example, 0.5 bar. When the rate of accumulation of solids falls sufficiently that the PD drops below the target value, for example, below 0.4 bar, valve 62 is left fully open and the control returns to step 84.

Although illustrated thus far in a case where the sensing connections to the inlet and outlet pressure are pressure sensors generating electrical signals, it should be noted that hydraulic sensing connections may also be used, and in some cases, the functions of the controller may be performed using a hydraulic controller/actuator integrated with adjustable valve 62. One such alternative implementation is illustrated schematically in FIG. 10.

Figure 10:
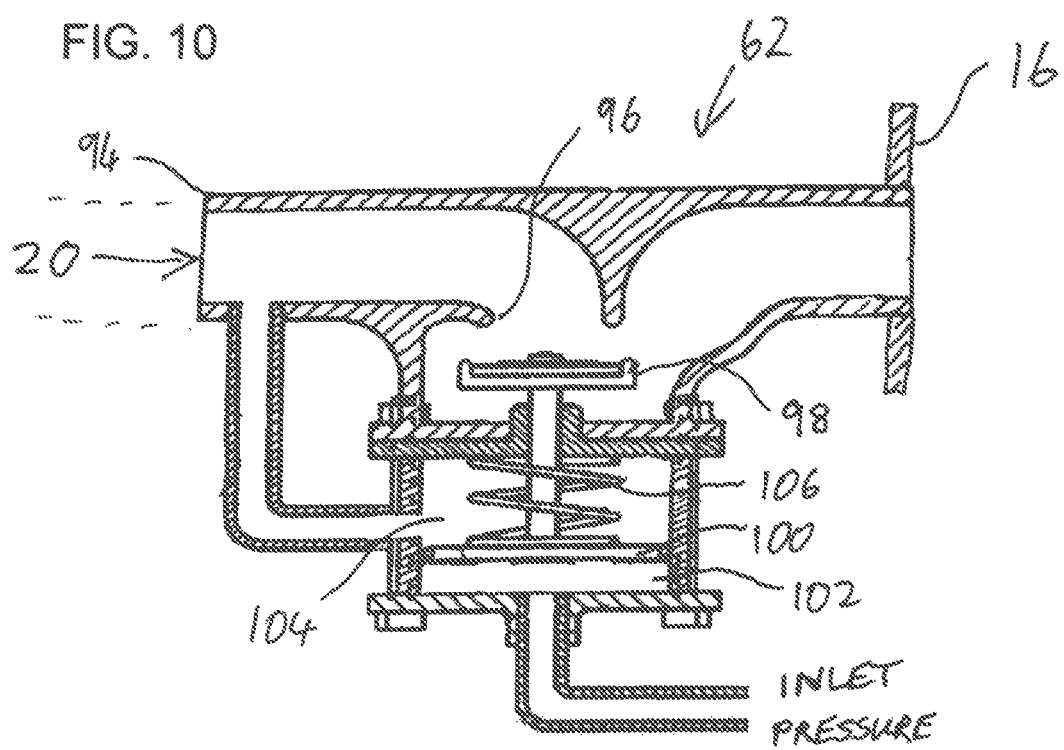
FIG. 10 is a cross-sectional view taken through an alternative, hydraulically-actuated flow-throttling arrangement.

Specifically, FIG. 10 shows an outlet pipe 94 defining a flow path from central flow path 20 via a valve seat 96 to outlet 16. A closure element 98 is movable relative to valve seat 96 to adjust the flow impedance of the valve. Displacement of the closure element is controlled by a hydraulic actuator, which may be a piston-based actuator with a piston 100 as shown or a diaphragm-based actuator. The actuator has a first chamber 102 on one side of the piston acting to close closure element 98 in fluid connection with a source of inlet pressure, and a second chamber 104 on the opposite side of the piston acting to open closure element 98 in fluid connection with a source of outlet pressure. A spring 106 provides additional bias towards the open position.

Under normal operating conditions of the valve, when outlet pressure is close to inlet pressure, the additional bias of spring 106 ensures that closure element 98 remains in its fully open position. In the event that the filter screens start to become clogged by accumulating solids, the outlet pressure in chamber 104 drops below the inlet pressure in chamber 102, resulting in a net force on piston 100 towards the closed position. When this net force exceeds the bias force provided by spring 106, the piston starts to move the closure element 98 towards the valve seat 96, thereby throttling the flow. As the flow rate decreases, it reduces the rate of build-up of solids until the backwash cleaning process returns to balance. As soon as the quantities of suspended solids fall, the pressure differential is again reduced and the closure element moves under bias of spring 106 back to its fully open position.

Although described herein with reference to a filter having a stack of filter disks and a backwash system having a spiral scanning pattern, it should be noted that the present invention can equally be applied in other contexts in which a backwash cleaning system passes over the surface of a filter screen. Other suitable applications include cases in which the filter screen is cylindrical, and where a suction nozzle traces a helical path across a surface of the filter screen. Additionally, the present invention may be applied to a range of other situations in which an automated cleaning arrangement operates to remove accumulated solids from the filter screens, including but not limited to arrangements with brushes or other mechanical arrangements for removing "cake" from filter screens, and sequential backwash arrangements in which reverse liquid pressure is applied sequentially to successive filter elements from a group of filter elements normally operating in parallel.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A filter for filtering a flow of liquid, the filter comprising:
   (a) a pressure vessel having an inlet and an outlet and a sidewall;
   (b) a partition deployed within said pressure vessel so as to subdivide said pressure vessel into a first filter chamber and a second filter chamber, said partition being a plate having sides respectively facing said chambers and defining an edge and including a seal radially extending from said edge and in sealing engagement with an interior surface of said sidewall;
   (c) a first filter configuration deployed within said first filter chamber, said first filter configuration comprising a filter screens having filter openings of a first opening size;
   (d) a second filter configuration deployed within said second filter chamber, said second filter configuration comprising a filter screens having filter openings of a second opening size smaller than said first opening size, wherein liquid flowing from said inlet to said outlet passes sequentially through said first filter configuration and through said second filter configuration; and
   (e) an automated cleaning arrangement deployed to remove accumulated solids from said filter screens of both said first filter configuration and said second filter configuration during operation of the filter,
wherein each of said first and second filter configurations is a filter disk comprising a spacer having first and second outward-facing filter screen support configurations, and having an outlet for flow of filtered liquid inwards to a central flow path, said first and second filter screen support configurations of said spacer supporting first and second filter screens forming corresponding first and second surfaces of the filter disk,
and wherein the filter further comprises a flow diverter deployed in said central flow path for diverting a flow of filtered liquid passing along said central flow path from said first filter configuration so as to flow outwards from said central flow path and into said second filter chamber so as to undergo a second filtering by flowing inwardly through said second filter configuration and returning to the central flow path; said flow diverter positioned at least partially within said second filter chamber and including (i) an open end communicating with the first filter chamber, (ii) a closed end blocking the central flow path prior to reaching the second filter configuration, and (iii) lateral openings therebetween opening into said second filter chamber.

2. The filter of claim 1, wherein said sidewall of said pressure vessel is a cylindrical sidewall, and wherein said partition is formed with said seal and said seal is an elastomer seal.

3. The filter of claim 1, further comprising at least a third filter configuration, and wherein said first, second and third filter configurations and said partition are configured for assembling alternately in a first configuration in which said third filter configuration is deployed on a first side of said partition so as to be within said first filter chamber and a second configuration in which said third filter configuration is deployed on a second side of said partition so as to be within said second filter chamber, thereby varying a number of said filter configurations in each of said first and second filter chambers.

4. The filter of claim 1, wherein said automated cleaning arrangement comprises a backwash assembly comprising a plurality of backwash nozzles including at least one backwash nozzle deployed for cleaning said filter screens of each of said first and second filter configurations, wherein said plurality of backwash nozzles are mounted so as to move together with a backwash assembly axle, said backwash assembly axle passing through said partition so as to extend within both said first and said second filter chambers.

5. The filter of claim 1, wherein:
said automated cleaning arrangement comprises:
   (i) at least two backwash conduits, each of said backwash conduits terminating in a suction nozzle deployed in facing relation to a respective filter screen of said first filter configuration or said second filter configuration, each of said backwash conduits being in fluid interconnection with a backwash drain; and
   (ii) a drive mechanism for displacing at least one of said suction nozzle and said filter screen of said first filter configuration and of said second filter configuration so as to generate a relative scanning motion of each of said suction nozzles across an area of a respective filter screen of said first filter configuration or said second filter configuration,
the filter further comprising:
(a) an adjustable valve associated with said outlet and adjustable to vary a flow impedance for liquid flowing via said outlet; and
(b) a controller deployed to control said adjustable valve, said controller having sensing connections to said pressure vessel and being configured to be responsive to a pressure difference between liquid pressure at said inlet and at said outlet such that, when said pressure difference exceeds a predetermined value, said controller controls said adjustable valve to constrict a rate of liquid flow via said outlet until operation of said automated cleaning arrangement stabilizes said pressure difference.

6. The filter of claim 5, wherein said filter screens of said first filter configuration and said filter screens of said second filter configuration are flat, and wherein each of said suction nozzles traces a spiral path across a surface of said respective filter screen of said first filter configuration or said respective filter screen of said second filter configuration.

7. The filter of claim 5, wherein said filter screens of said first filter configuration and said second filter configuration are deployed as part of a plurality of filter disks coaxially arrayed along a central flow path in fluid communication with said outlet, said drive mechanism comprising a rotary driver for driving rotation of said first filter configuration and said second filter configuration about an axis of said first filter configuration and said second filter configuration.

8. The filter of claim 1, wherein each of said backwash conduits extends along a backwash arm, said drive mechanism moving said backwash arm in a reciprocating arcuate motion so that each said suction nozzle moves in a spiral path across a surface of said respective filter screen of said first filter configuration and said second filter configuration.

9. The filter of claim 5, wherein said controller is an electronic controller comprising a processing system and an actuator operated by said processing system to adjust said adjustable valve, said sensing connections being implemented as electrical connections to pressure sensors deployed for sensing a pressure in said inlet and a pressure in said outlet.

10. The filter of claim 5, wherein said controller is a hydraulic controller comprising at least one hydraulic actuator deployed to adjust said adjustable valve, said sensing connections being implemented as hydraulic connections to said inlet and said outlet.

* * * * *